United States Patent [19]

Shiueh et al.

[11] Patent Number: 5,432,219
[45] Date of Patent: Jul. 11, 1995

[54] STYRENIC RESIN COMPOSITION FOR EXTRUSION

[75] Inventors: Dong-Bi Shiueh; Peter Chen; Jung-Tsang Su, all of Tainan City, Taiwan

[73] Assignee: Chie Mei Corporation, Taiwan

[21] Appl. No.: 220,938

[22] Filed: Mar. 31, 1994

Related U.S. Application Data

[63] Continuation of Ser. No. 9,841, Jan. 27, 1993, abandoned.

[51] Int. Cl.⁶ ................................................ C08K 5/10
[52] U.S. Cl. ..................................... 524/291; 524/288; 524/307; 524/308; 524/309; 524/310
[58] Field of Search ............... 524/291, 289, 307, 308, 524/309, 310

[56] References Cited

U.S. PATENT DOCUMENTS

| | | | |
|---|---|---|---|
| 4,202,948 | 5/1980 | Peascoe | 525/70 |
| 4,464,496 | 8/1984 | Nemzek et al. | 524/91 |
| 4,985,481 | 1/1991 | Neri et al. | 524/120 |
| 5,145,893 | 9/1992 | Galbo et al. | 524/98 |

Primary Examiner—Paul R. Michl
Assistant Examiner—Edward J. Cain
Attorney, Agent, or Firm—Brooks & Kushman

[57] ABSTRACT

A styrenic resin composition for extrusion of sheets, films, pipes and profiles, includes (1) 100 parts by weight of a styrenic resin having 15 to 100% by weight of a styrenic graft copolymer (A) and 85 to 0% by weight of a styrenic polymer (B); and (2) 0.01 to 3.0 parts by weight of 2,2'-oxamido-bis-[ethyl-3-(3,5-di-tertiary butyl-4-hydroxyphenyl)propionate].

6 Claims, No Drawings

STYRENIC RESIN COMPOSITION FOR EXTRUSION

This application is a continuation of Ser. No. 08/009,841, filed Jan. 27, 1993, now abandoned.

BACKGROUND OF THE INVENTION

Field of the Invention

This invention relates to a styrenic resin composition for extrusion of sheets, films, pipes and profiles, more particularly to a composition of styrenic resin which is suitable for thermoforming extrusion products.

Conventionally, styrenic resin which contains grafted rubber particles, such as acrylonitrile-butadiene-styrene, methyl methacrylate-butadiene-styrene, acrylonitrile-methyl methacrylate-butadiene-styrene and acrylonitrile-EPDM-styrene are mainly used for injection molding and some of which are used for extrusion of sheets, films, pipes and profiles and further to thermoforming of the extrusion products.

The styrenic resins generally have some practical problems when they are used in the extrusion of sheets, films, pipes and profiles even if the same styrenic resins have no problems in the injection molding process. First, die lines and uneven gloss are formed on the surface of the extruded product, thus affecting the appearance of the extruded product. Second, the roller will be contaminated by oily material during the manufacturing process, thus interrupting the extruding process. Third, an injected product which is made of the styrenic resin has a sufficient impact strength, while the extruded product of sheets has a poor impact strength. When the extruded product of sheets and films is further treated by means of the thermoforming process, the thickness of the product is not uniform, thus resulting in poor appearance and strength.

SUMMARY OF THE INVENTION

It is therefore an object of this invention to provide a styrenic resin composition which will not contaminate the rollers during extrusion of sheets, films, pipes and profiles and which will produce an extruded product that has an excellent appearance and good impact strength.

It is another object of this invention to provide a styrenic resin composition which will produce an extruded product that has uniform thickness after being treated by means of thermoforming process.

The feature of the present invention of the styrenic resin composition for extrusion of sheets, films, pipes and profiles comprises:

(1) 100 parts by weight of a total styrenic resin having 15 to 100% by weight of a styrenic graft copolymer (A) and 85 to 0% by weight of a styrenic polymer (B); and (2) 0.01 to 3.0 parts by weight of 2,2'-oxamido-bis-[ethyl-3-(3,5-di-tertiary butyl-4-hydroxyphenyl)-propionate], (hereinafter referred to as PCC).

In accordance with the present invention, the term "styrenic graft copolymer" means that the said vinyl monomers which contain styrene are polymerized in the presence of rubber polymer to produce discrete rubber particles which grafted with the said vinyl monomers.

DETAILED DESCRIPTION OF THE PREFERRED EMBODIMENTS

The rubber polymer is obtained by polymering a monomer of diene series with or without vinyl monomers copolymerizable with it and has a glass transition temperature below $-20°$ C. The monomer of diene series is selected from the group of butadiene, isoprene, and ethylidene norbornene. Representative examples of the rubber polymer are, for instance, a butadienic polymer such as polybutadiene, butadiene-styrene copolymer, butadiene-acrylonitrile copolymer, butadiene-butyl acrylate copolymer, butadiene-acrylonitrile-divinylbenzene copolymer, and an ethylene-propylene-ethylidene norbornene copolymer. The butadienic polymer is preferable.

One of the preferable methods of producing a styrenic graft copolymer (A) is forming a rubber solution of the rubber polymer which dissolved in vinyl monomers containing styrene and polymerizing the solution with stirring (hereinafter referred to as rubber solution graft polymerization). The rubber solution graft polymerization is carried out by means of bulk or solution polymerization with stirring so as to form rubber particles. The polymerization process includes a continuous bulk or solution process or batch type bulk suspension process. The continuous bulk or solution polymerization is preferable in view of the uniformity of the quality and the color.

Examples of rubber polymer used in rubber solution graft polymerization are, for instance, a butadienic polymer such as high cis-polybutadiene, low cis-polybutadiene containing 7 to 35% by weight of 1,2-vinyl group, styrene-butadiene random copolymer, styrene-butadiene block copolymer, and an ethylene-propylene-ethylidene norbornene copolymer. The butadienic polymer is preferable.

Preferably, the ratio of the rubber polymer and the vinyl monomers containing styrene is determined so that the content of the rubber polymer of the obtained graft copolymer is 5 to 30 percent by weight.

The grafting monomers of the styrenic graft copolymer (A) produced by rubber solution graft polymerization process comprises: at least 40% by weight of styrene, preferably 50 to 90% by weight; below 60%, preferably 50 to 10% by weight of at least one rigid acryl monomers selected from acrylonitrile and methyl methacrylate; and optionally 0 to 30% by weight of at least one copolymerizable vinyl monomers; wherein the composition of the rigid acryl monomer comprises 0–100% by weight of acrylonitrile and 0–100% by weight of methyl methacrylate. From the viewpoint of effectively improving the hardness and appearance of the extruded product, it is desired to use 10–80% by weight of methyl methacrylate. Representative examples of copolymerizable vinyl monomer are, for instance, α-methyl styrene, para-methyl styrene, tribromo styrene, phenyl maleimide, maleic anhydride, dimethyl fumarate, methacrylic acid, methyl acrylate, N-vinyl-pyrrolidone, dimethyl itaconate, hydroxyethyl methacrylate, divinylbenzene, and ethylene dimethacrylate.

In accordance with the present invention, the term "vinyl monomer" includes styrene and the ethylenic unsaturated compounds which are suitable for radical polymerization. The styrenic graft copolymer, which is produced from the rubber solution graft polymerization process, contains rubber particles grafted with and/or occluded with styrenic polymer and free styrenic polymer.

From the viewpoint of improving the impact strength of the extruded product, the average particle size of the rubber particles is preferably 0.5–5.0 μm. The total amount of the styrenic polymer grafted on the rubber particles and the styrenic polymer occluded in the rubber particles, which is known as the degree of grafting, is 50–300% by weight, preferably 80–200% by weight, based on the weight of the rubber polymer.

The average molecular weight of the free styrenic polymer is preferably 80,000 to 400,000, most preferably 100,000 to 350,000. The gloss of the extruded product depends on the rubber particle size. For example, when the particle size of the rubber particles is 0.5–1.3 μm, the gloss of the extruded product is high. When the particle size of the rubber particles is 1.3–5.0 μm, the gloss of the extruded product is low.

Another preferable method of producing a styrenic graft copolymer (A) is an emulsion graft copolymerization method which includes the step of adding monomers containing styrene into the rubber latex at one time or adding the monomer into the rubber latex gradually while polymerization reaction proceeds. Of course, the emulsion-bulk polymerization and emulsion-suspension polymerization processes are included in the emulsion graft polymerization process.

The rubber polymer used in the emulsion graft polymerization method contains diene component. Typical rubber polymers are butadienic polymers such as polybutadiene, butadiene-acrylonitrile copolymer, butadiene-styrene copolymer, butadiene-divinylbenzene copolymer, butadiene-butyl acrylate copolymer and butadiene-acrylonitrile-divinylbenzene copolymer and ethylene-propylene-ethylidene norbornene copolymer. Preferable rubber polymers are polybutadiene and copolymer of butadiene particularly which contains below 10 wt % of styrene and/or acrylonitrile. The ratio of the rubber polymer and the vinyl monomer containing styrene is so determined that the content of the rubber polymer of the obtained graft copolymer is 35–85% by weight, preferably 50–80% by weight.

The grafting monomers of the styrenic graft copolymer comprises: at least 40% by weight of styrene, preferably 50 to 90% by weight; below 60% by weight of rigid acryl monomer consisting of acrylonitrile and/or methyl methacrylate, preferably 50 to 10% by weight; and optionally 0 to 30% by weight of at least one copolymerizable vinyl monomers; wherein the rigid acryl monomer comprises 0–100% by weight of acrylonitrile and 0–100% by weight of methyl methacrylate. From the viewpoint of effectively improving the physical properties and reducing the cost of an extruded product, it is desired to use 70–100% by weight of acrylonitrile. Representative examples of other vinyl monomers are, for instance, para-methyl styrene, tribromo styrene, methyl acrylate, glycidyl methacrylate and divinylbenzene.

The styrenic graft copolymer, which is produced from the emulsion graft polymerization process, contains rubber particles grafted with and/or occluded with styrenic polymer and free styrenic polymer. From the viewpoint of improving the impact strength of the extruded product, the average particle size of the rubber particles is preferably 0.05–0.4 μm. Total weight of the styrenic polymer combined with the rubber particles and the styrenic polymer contained in the rubber particles, which is known as the degree of grafting, is 20–100% by weight, preferably 25–70% by weight, based on the weight of the rubber polymer. The average molecular weight of the free styrenic polymer is preferably 40,000 to 300,000, most preferably 50,000 to 250,000. From the appearance and physical properties of view, the preferable particle size distribution is 0–85% by weight of particles having a diameter of 0.05–0.1 μm, 0–40% by weight of particles having a diameter of 0.1–0.2 μm and 15–100% by weight of particles having a diameter of 0.2–0.4 μm. When the particle size of the rubber particles is 1.3–5.0 μm, the gloss of the extruded product is low.

The recovery of styrenic graft copolymer from its emulsified form is generally performed by coagulating with the use of a coagulation agent. Examples of coagulation agents are, for instance, acids (such as sulfuric acid, acetic acid), calcium salts (such as calcium chloride), magnesium salts (such as magnesium chloride, magnesium sulfate, and aluminum salts (such as aluminum sulfate). Magnesium salts are preferred in the present invention.

In order to obtain a better appearance, impact strength and uniform thickness of extruded product after thermoforming, the styrenic graft copolymer (A) can be formed by blending an appropriate ratio of a graft copolymer (G1) which is obtained by means of the rubber solution graft polymerization process, and a graft copolymer (G2) which is obtained by means of the emulsion graft polymerization process. The styrenic graft copolymer (G1) and contains 5–30% by weight of rubber polymer which has an average particle size of 0.5–5.0 μm. The styrenic graft copolymer (G2) contains 35–85% by weight of a rubber polymer which has an average particle size of 0.05–0.4 μm. The rubber polymer of the styrenic graft copolymer (G1) is 3 to 80% by weight, preferably 5 to 70% by weight, based on the total weight of the rubber polymers of (G1) and (G2).

In accordance with the present invention, the styrenic polymer (B) composed of at least 50% by weight of styrene. Examples of thermoplastic styrenic polymers are, for instance, polystyrene, styrene-acrylonitrile copolymer, styrene-methyl methacrylate copolymer, styrene-acrylonitrile-methyl methacrylate copolymer, styrene-phenyl maleimide copolymer, styrene-acrylonitrile-phenyl maleimide copolymer, styrene-acrylonitrile-divinylbenzene copolymer, styrene-maleic anhydride copolymer, and a copolymer formed by reacting styrene-maleic anhydride copolymer and aniline so as to undergo an imidization process. The styrenic polymer (B) preferably comprises 50–90% by weight of styrene; 50–10% by weight of rigid acryl monomer(s) consisting of acrylonitrile and/or methyl methacrylate; 0 to 30% by weight of at least one copolymerizable vinyl monomers. The rigid acryl monomer comprises 0–100% by weight of acrylonitrile and 0–100% by weight of methyl methacrylate. From the viewpoint of effectively improving the rigidity and appearance of the extruded product, it is desired to use 10–90% by weight of methyl methacrylate.

Preferably, the average molecular weight of the styrenic polymer (B) is 60,000 to 400,000, most preferably 80,000 to 300,000. The content of the rubber polymer in the total styrenic resin is preferably 4–30% by weight, most preferably 10–25% by weight.

In accordance with the present invention, the styrenic resin comprises 15–100% by weight of the styrenic graft copolymer (A) and 85–0% by weight of the styrenic polymer (B). If the content of the styrenic graft copolymer (A) is below 15% by weight, the impact strength of the extruded product will be insufficient.

The effect of the PCC of this invention is to prevent the sheet extrusion rollers from being contaminated and also to eliminate the die lines on the surface of the extruded product. These effects are unknown and are surprising to whom skilled in the art. The mechanism is unknown till now.

The amount of the PCC is preferably 0.01–3.0 parts by weight, based on the styrenic resin. When the amount of the PCC is smaller than 0.01 part by weight, none of the above-mentioned effects will be produced. When the amount of the PCC is greater than 3.0 parts by weight, the cost of the extruded product will increase. The PCC may be added after the styrenic resin has been polymerized or during each polymerization stage of the various components. There is no particular limitation regarding adding the PCC in what stage of producing the styrene resin composition.

The styrenic resin composition of this invention can be used to form sheets, films, pipes and profiles. The styrenic resin composition is suitable for manufacturing sheets and films which may be used in thermoforming processes, such as vacuum forming and compression forming. Examples of the thermoforming products are inner box and door linings of a refrigerator, linings of a case, suitcases, etc.

Other additives may be added to the styrenic resin composition of this invention. Examples of these additives are, for instance, antioxidant, lubricant, UV-light absorber, UV-light stabilizer, anti-statics, fillers, reinforcing agent, coloring agent, flame retardant, synergistic additives for flame retardants, heat stabilizer, coupling agent and other additives.

Examples of the antioxidant include phenolic antioxidants, thio-ether antioxidants, phosphorous antioxidants and chelating agent. Representative examples of the phenolic antioxidants include octadecyl(3,5-di-tert.butyl-4-hydroxyphenyl)propionate, triethylene glycol-bis[3-(3-tert.butyl-5-methyl-4hydroxyphenyl)propionate], [3-(3,5-di-tert.butyl-4hydroxyphenyl)propionate], 2-tert.butyl-6-(3-tert.butyl-2-hydroxy-6-methylbenzyl)-4-methylphenyl acrylate, 2,2'-methylene-bis(4-methyl-6-tert.butyl phenol) and 2,2'-thio-bis(4-methyl-6-tert.butylphenol).

Representative examples of the thio-ether antioxidants include distearyl thio-dipropionate, dipalmitylthio-dipropionate, pentaerythritol-tetrakis($\beta$-dodecylmethyl-thiopropionate) and dioctadecyl thioether.

Representative examples of the phosphorous antioxidants include phosphite antioxidants such as tris (nonylphenyl) phosphite, thidecyl phosphite, cyclicneopantane tetralyl-bis(octadodecyl phosphite), 4,4'-butylidene-bis(3-methyl-6-tert.butylphenyl-ditridecyl phosphite), tris(2,4-tert.butyl)phosphite or tetrakis(2,4-tert.butyl)-4,4'-biphenylenediphosphonate and 9,4-dihydro-9-oxa-10-phospho-phenanthrene-10-oxide.

Representative examples of chelating agent include bisbenzoyl methane and sodium salts of ethylene diamine tetra-acetic acid.

The amount of the antioxidants is generally 0.03–1.6% by weight, based on the styrenic resin.

Representative examples of the lubricants include metal soaps containing calcium stearate, magnesium stearate, lithium stearate, and ethylene bis-stearamide, methylene bis-stearamide, palmityl amide, butyl stearate, palmitylstearate, polypropylene glycol mono-stearate, behenic acid, stearic acid, polyethylene wax, montan wax, carnauba wax and petroleum wax. The amount of the lubricant is generally 0.03–5.0% by weight, based on the total styrenic resin.

Representative examples of the UV-absorber include benzotriazole compounds and benzophenones. Representative examples of the UV stabilizer include hindered amines. The amount of the UV-absorber and the UV stabilizer is generally 0.02–2.0% by weight, based on the styrenic resin.

Representative examples of the anti-static agent include low molecular compounds such as tertiary amines and quaternary ammonium salts, and and polyamide polyether with epichlorohydrin polymer.

Representative examples of the fillers include calcium carbonate, silica and mica.

Representative examples of the reinforcing agents include glass fiber and carbon fiber.

Representative examples of the coloring agent include titanium oxide, ferric oxide, carbon black and phthalocyanine blue.

Representative examples of the flame retardant or its synergistic additives include decabromo-diphenyl ether, tetrabromo-bisphenol A, brominated-polystyrene oligomer, bromoepoxy resin, hexabromocyclododecane, chloropolyethylene, triphenyl phosphate, red phosphorous, antimony oxide, aluminum hydroxide, magnesium hydroxide, zinc borate, melamine, silicone oil, polytetrafluoroethylene powder and expanding graphite.

Representative examples of the heat stabilizer include dibutyl tin maleate and basic magnesium aluminum hydroxy carbonate.

Representative examples of the coupling agent include silane, titanate and zirconate.

To improve the properties of the styrenic resin composition, proper polymeric additives may be added. Representative examples of the polymeric additives are, for instance, acrylic polymers which are used as processing aids in order to improve the extrusion processibility, and chlorinated polyethylene, polymethyl methacrylate, polycarbonate resin, polyamide resin, polybutylene terephthalate, olefinic polymer, styrenic thermoplastic elastomer, low molecular weight of styrene-maleic anhydride copolymer, silicone oil and various compatibilizers.

The average particle size of the rubber particles of this invention is determined by transmission electronic micrograph based on area average.

The average molecular weight of the styrenic polymer of this invention is determined by gel permeation chromatograph which is according to the weight average molecular weight standard of polystyrene.

The present invention is more specifically described and explained by means of the following Examples, in which all parts and % are by weight unless otherwise noted. It is to be understood that the present invention is not limited to these Examples.

[Manufacturing Example 1]

Manufacture of graft polymer by rubber solution graft polymerization

Four polymerization reactors equipped with stirrers are connected in series. Each of the reactors has a volume of 45 liters. The reactor was charged with raw material mixture solution at a rate of 24 Kg/hr. The raw material mixture contains 67% of styrene, 22% of acrylonitrile and 11% of polybutadiene (available from Asahi Kasei Company as ASAPRENE 700A). The other feed contains 8.0 g/hr of ethylene bis-stearamide, benzoyl peroxide, tertiary dodecylmercaptan and recovery solution which will be described hereinafter. The reaction temperature of the reactors are as follows: the temperature of the first reactor was maintained at 97° C.; the temperature of the second reactor was maintained at 100° C.; the temperature of the third reactor was maintained at 106° C. and the temperature of the fourth reactor was maintained at 110° C. The toluene content of the reaction solution was maintained at 16%. The reaction solution is passed through a devolatilizing device in order to remove the volatile components after being out of the fourth reactor. The removed volatile components are condensed by means of condensers and serve as the aforementioned recovery solution which is mixed continuously with the raw material mixture solution. The polymerization rate of this process may be adjusted by the amount of the benzoyl peroxide. The melt flow index may be adjusted by the amount of the tertiary dodecylmercaptan. A graft copolymer is obtained at a rate of 24 Kg/hr. The graft copolymer contains 67% of styrene, 22% of acrylonitrile and 11% of polybutadiene. The melt flow index of the obtained graft copolymer, which is hereinafter referred to as G-1, is 0.9 and the average diameter of the rubber particles is 1.1 μm.

The melt flow index is measured in accordance with ASTM D-1238 condition G (unit: g/10 min).

[Manufacturing Example 2]

Manufacture of polybutadiene latex

| butadiene | 100 parts |
| deionic water | 90 parts |
| potassium stearate | 2.7 parts |
| potassium disproportionated rosinate | 2.7 parts |
| potassium persulfate | 1.6 parts |
| dodecylmercaptan | 0.33 part |

The above components were stirred and the reaction was carried out at 60° C. for 60 hours. The residual butadiene was then removed at reduced pressure. Suitable amount of water is added and a polybutadiene latex (hereinafter referred to as E-1) with a concentration of 50% was obtained.

[Manufacturing Example 3]

Manufacture of graft polymer by emulsion graft polymerization

| E-1 (dry base) | 60 parts |
| styrene | 30 parts |
| acrylonitrile | 12 parts |
| cumene hydroperoxide | 0.22 part |
| potassium oleate | 1.5 parts |
| sodium pyrophosphate | 0.3 part |
| dextrose | 0.1 part |
| ferrous sulfate | 0.1 part |
| water (including water in E-1) | 100 parts |

A reaction was carried out at 85° C. for 5.5 hours by stirring, and a graft copolymer latex was obtained.

The graft copolymer latex is heated, and a required amount of 5% magnesium sulfate solution is added to the heated-graft copolymer latex until the heated graft copolymer latex is coagulated. The coagulated graft copolymer is filtrated and dried, and a graft copolymer powder (hereinafter referred to as G-2) is obtained. The obtained graft copolymer comprises 60% of polybutadiene, 29% of styrene and 11% acrylonitrile. The average particle size of the rubber particles is 0.31 μm.

[Manufacturing Example 4]

Manufacture of styrenic polymer

A polymerization reactor, which is equipped with a stirrer and which has a volume of 45 liters, was charged with a raw material mixture solution at a rate of 12 Kg/hr. The raw material mixture contains 73% of styrene and 27% of acrylonitrile. The other feed contains 3.0 g/hr of ethylene bis-stearamide, benzoyl peroxide, tertiary dodecylmercaptan and recovery solution which will be described hereinafter. The temperature of the polymerization reactor was maintained at 108° C. The toluene content in the reaction solution was maintained at 15%. The conversion was maintained at 55%.

After the reaction solution has passed through a devolatilizing device so as to remove the volatile components from the reaction solution, styrene-acrylonitrile copolymer particles are obtained. The removed volatile components are condensed by means of condensers and serve as the aforementioned recovery solution which is continuously mixed with the raw material mixture solution. The polymerization speed of this process may be adjusted by the amount of the benzoyl peroxide. The melt flow index may be adjusted by the amount of the tertiary dodecylmercaptan. A styrene-acrylonitrile copolymer (hereinafter referred to as S-1) was obtained at a rate of 12 Kg/hr. S-1 contains 73% of styrene and 27% of acrylonitrile and has a melt flow index of 1.0.

[Manufacturing Example 5]

Manufacture of styrenic polymer

The procedure of Manufacturing Example 4 was repeated except that the raw material mixture solution contains 60% of styrene, 22% of acrylonitrile and 18% of methyl methacrylate. A styrene-acrylonitrile-methyl methacrylate copolymer (referred as S-2 hereinafter) which has a melt flow index of 1.0 is obtained. S-2 contains 60% of styrene, 22% of acrylonitrile and 18% of methyl methacrylate.

[Example 1]

40 parts of G-1, 20 parts of G-2, 40 parts of S-1, and 0.3 part of PCC were mixed with an additive of 17% of octadecyl(3,5-di-tert.butyl-4hydroxyphenyl)propionate, 50% of tris(2,4-di-tert.butyl phenyl) phosphite and 33% of magnesium stearate (hereinafter referred to as additive A) in an extruder. A sheet with a thickness of 3.0 mm is formed by an extrusion sheet manufacturing device. The extrusion sheet manufacturing device includes four cooling rollers connected downstream of a single screw extruder which has a screw diameter of 90 mm and L/D=28.

A visual observation of the extruded sheet was conducted after the extrusion was proceeded 48 hours. No die line was formed on the sheet, and the sheet has a uniform gloss and thickness. In addition, the rollers were not contaminated.

The obtained sheet was cut into testing pieces. The IZOD impact strength of the testing piece is 15 (unit: Kg-cm/cm), which was measured in accordance with ASTM D-256. While the IZOD impact strength of the same composition made by means of injection molding is 20.

[Comparative Example 1]

The procedure of Example 1 was repeated except that PCC is eliminated from the composition. The extruded sheets are tested in the above-mentioned manner.

It was found that the surface of the sheet has a plurality of die lines, the gloss of the sheet surface is not uniform, and that the rollers were gravely contaminated. The IZOD impact strength of the extruded sheet is 14 while the IZOD impact strength of the same composition made by injection molding is 20.

[Example 2]

70 parts of S-1, 30 parts of G-2 and 0.2 part of PCC were mixed with 0.7 part of the additive A. A sheet is formed in a manner similar to that of Example 1.

No die line was found on the sheet surface, and the sheet has a uniform gloss and thickness. In addition, the rollers were not contaminated. The IZOD impact of the extruded sheet is 7, while the IZOD impact strength of the same composition made by injection molding is 17.

[Comparative Example 2]

The procedure of Example 2 was repeated except that PCC is eliminated from the composition. The extruded sheets are tested in the above-mentioned manner.

It was found that the surface of the sheet has a plurality of die lines, the gloss of the sheet surface is not uniform, and that the rollers were gravely contaminated. The IZOD impact strength of the extruded sheet is 6, while the IZOD impact strength of the injection testing piece is 16.

[Example 3]

90 parts of G-1, 10 parts of G-2 and 0.3 part of PCC were mixed with 0.7 part of the additive A. A sheet is formed in a manner similar to that of Example 1.

No die line was found on the sheet surface, and the sheet has a uniform gloss and thickness. In addition, the rollers were not contaminated. The IZOD impact of the extruded sheet is 18, while the IZOD impact strength of the injection testing piece is 25.

[Example 4]

40 parts of G-1, 20 parts of G-2, 40 parts of S-2 and 0.3 part of PCC were mixed with 0.7 part of the additive A. A sheet is formed in a manner similar to that of Example 1.

No die line was found on the sheet and the sheet has a uniform gloss and thickness. In addition, the rollers were not contaminated. The IZOD impact of the extruded sheet is 15, while the IZOD impact strength of the injection testing piece is 22.

[Application Example 1]

The extruded sheets, which were obtained from Examples 1 and 4, are tested by a vacuum forming basic testing method. The results of the test are shown in Table 1. It can be seen that the vacuum forming ability of the extruded sheets of Examples 1 and 4 are greatly improved.

The vacuum forming basic testing method is carried out in accordance with the tensile strength testing method of ASTM D-638. The lesser necking of the testing piece is, the better will be the vacuum forming ability. Also, the larger elongated of the testing pieces, the larger elongation of vacuum forming ability.

TABLE 1

| sample | necking | elongation % |
| --- | --- | --- |
| Example 1 | No | 103 |
| Example 4 | No | 106 |

[Application Example 2]

The extruded sheet of Example 4 is tested by means of a pencil hardness test. The sheet surface is scraped by a pencil with a hardness of H (available from Mitsubishi Pencil Company under the brand name UNI), then inspect the sheet surface. The surface of the extruded sheet has no scratch formed thereon.

It is found that the extruded product made from the composition of styrenic resin of this invention has an excellent appearance and good impact strength. In addition, the rollers are not contaminated. When the extruded product is treated by thermoforming processes, the thickness of the product is uniform, and the appearance and impact strength of the same are excellent.

With this invention thus explained, it is apparent that numerous modifications and variations can be made without departing from the scope and spirit of this invention. It is therefore intended that this invention be limited only as indicated in the appended claims.

We claim:

1. A method of decreasing the formation of die lines during the production of sheets, films, pipes and profiles comprising the steps of:
    providing a styrenic resin composition, said styrenic resin composition comprising:
    (1) 100 parts by weight of a styrenic resin having 15 to 100% by weight of a styrenic graft copolymer (A) and 85 to 0% by weight of a styrenic polymer (B); and
    (2) 0.01 to 3.0 parts by weight of 2,2'-oxamido-bis-[ethyl-3-3(3.5-di-tertiary butyl-4-hydroxyphenyl) propionate];
    extruding the styrenic resin composition; and recovering the extruded material having decreased formation of die lines therein.

2. A method of claim 1 wherein the grafting styrenic polymer contained in said styrenic graft copolymer (A) and styrenic polymer (B) both consist of 0 to 90% by weight of styrene, 50 to 10% by weight of at least one rigid acryl monomer selected from acrylonitrile and methyl methacrylate, and 0 to 30% by weight of at least one vinyl monomer which is copolymerizable with styrene and said rigid acryl monomer.

3. The method of claim 1 wherein said styrenic graft copolymer (A) is comprised of:
    a styrenic graft copolymer (G1) having rubber particles formed by means of a bulk or solution polymerization process and containing 5 to 30% by weight of rubber polymer, said rubber particles having an average particle size of 0.5 to 5.0 μm; and
    a styrenic graft copolymer (G2) having rubber particles formed by means of an emulsion polymerization process and containing 35 to 85% by weight of rubber polymer, said rubber particles having an average particle size of 0.05 to 0.4 μm;
    wherein the rubber polymer of the styrenic graft copolymer (G1) is 3 to 80% by weight based on the total content of the rubber polymers of styrenic graft copolymers (G1) and (G2), and the total content of the rubber polymers in the styrenic resin is 4 to 30% by weight.

4. The method of claim 3 wherein at least one of the grafting styrenic polymer contained in the styrenic graft copolymer (G1) and the styrenic polymer (B) comprises: 50–90% by weight of styrene; 50–10% by weight of at least one rigid acryl monomer selected from acrylonitrile and methyl methacrylate; and 0 to 30% by weight of at least one monomer which is copolymerizable with styrene and said rigid acryl monomer; wherein the rigid acryl monomer comprises 10–80% by weight of methyl methacrylate and 90–20% by weight of acrylonitrile.

5. The method of claim 2 wherein said styrenic graft copolymer (A) is comprised of:

a styrenic graft copolymer (G1) having rubber particles formed by means of a bulk or solution polymerization process and containing 5 to 30% by weight of rubber polymer, said rubber particles having an average particle size of 0.5 to 5.0 μm; and a styrenic graft copolymer (G2) having rubber particles formed by means of an emulsion polymerization process and containing 35 to 85% by weight of rubber polymer, said rubber particles having an average particle size of 0.05 to 0.4 μm;

wherein the rubber polymer of the styrenic graft copolymer (G1) is 3 to 80% by weight based on the total content of the rubber polymers of styrenic graft copolymers (G1) and (G2), and the total content of the rubber polymers in the styrenic resin is 4 to 30% by weight.

6. The method of claim 1 wherein said 2,2'-oxamido-bis-[ethyl-3,3-(3,5-di-tertiarybutyl-4-hydroxyphenyl)-propionate] (2) is added to said styrenic resin composition (1) in an extruder.

* * * * *